United States Patent [19]

Drennen et al.

[11] 4,050,265

[45] Sept. 27, 1977

[54] FORCE-DISPLACEMENT CONTROLLER KNOB

[75] Inventors: Thomas G. Drennen, Ferguson; Allen Neander, Bel-Ridge, both of Mo.

[73] Assignee: The United States of America as represented by the Secretary of the Navy, Washington, D.C.

[21] Appl. No.: 711,192

[22] Filed: Aug. 3, 1976

[51] Int. Cl.[2] .................... F16D 3/64

[52] U.S. Cl. .................... 64/11 R; 74/553; 403/372; 403/226; 403/227

[58] Field of Search .................... 64/11 R, 27 NM; 403/226, 227, 228, 372; 74/553; 73/141 R, 141 A; 92/179; 338/35

[56] References Cited

U.S. PATENT DOCUMENTS

| | | | |
|---|---|---|---|
| 1,920,436 | 8/1933 | Riker | 403/228 |
| 3,013,643 | 12/1961 | Perry | 403/227 |
| 3,158,072 | 11/1964 | Detrez | 92/179 |
| 3,454,920 | 3/1967 | Mehr | 338/5 |

*Primary Examiner*—Samuel Scott
*Assistant Examiner*—R. C. Turner
*Attorney, Agent, or Firm*—R. S. Sciascia; L. I. Shrago; C. E. Vautrain, Jr.

[57] ABSTRACT

A force-displacement controller knob for use in isometric control devices is provided. A controller knob component is mounted on existing control shafts and the knob itself contains a pair of compressible, resilient washers separated by and contacting a rigid washer in a chamber in the knob so that force appied in any direction on the knob will be transferred to the control shaft in a resistance ratio determined by the compressibility of the resilient washers.

6 Claims, 2 Drawing Figures

FORCE-DISPLACEMENT CONTROLLER KNOB

This invention relates in general to finger-tip isometric or force controls and, more particularly, to a control of this type which provides increased tactile feedback to the operator.

Miniature control devices which accept pressure inputs from the operator, known as finger-tip isometric or force controls, are presently in use for a variety of manual control applications. These devices measure the applied force from the operator by means of strain gauges in each axis and yield proportional output signals. They are deficient in the amount or degree of control movement accompanying the force inputs, and previous attempts to provide such force/displacement cues have been directed to the use of force controls with less rigid control shafts and miniature displacement joysticks. The joysticks use potentiometers to measure the control movement and spring-loading to provide self-centering and force feedback characteristics. The present invention overcomes the tactile feedback deficiencies of these prior devices primarily by increasing the displacement, i.e. the axial movement, of the control knob.

Accordingly, it is an object of the present invention to provide a finger-tip isometric control device which permits substantially increased control movement in response to force inputs.

Another object of the invention is to provide a miniature control device which permits greater displacement ranges of the controller knob without increasing the possibility of shaft fractures.

A further object of the invention is to provide a miniature control device in which greater displacement ranges of the controller knob are permitted without the use of mechanical linkages such as gears, gimbals, displacement joysticks and the like which are susceptible to slippage, backlash and misalignment problems.

Figure 2:
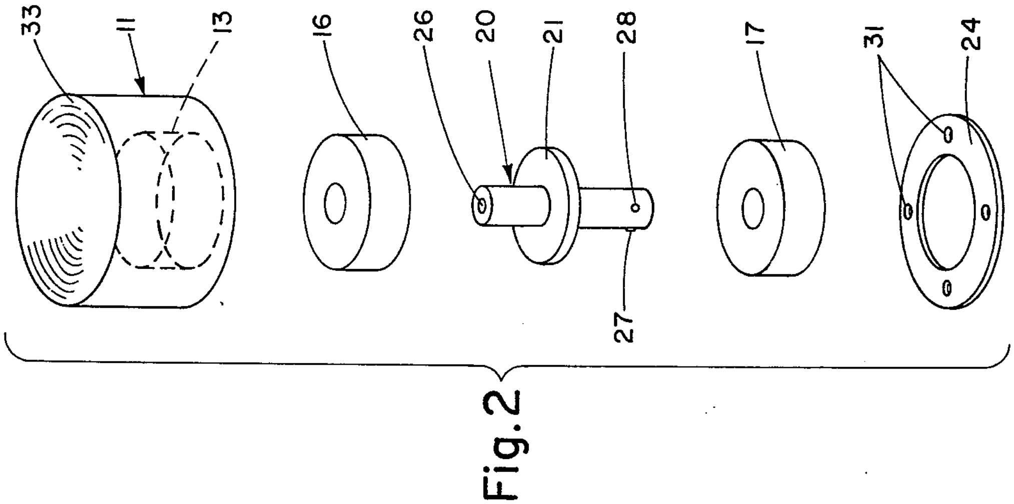
Figure 1:
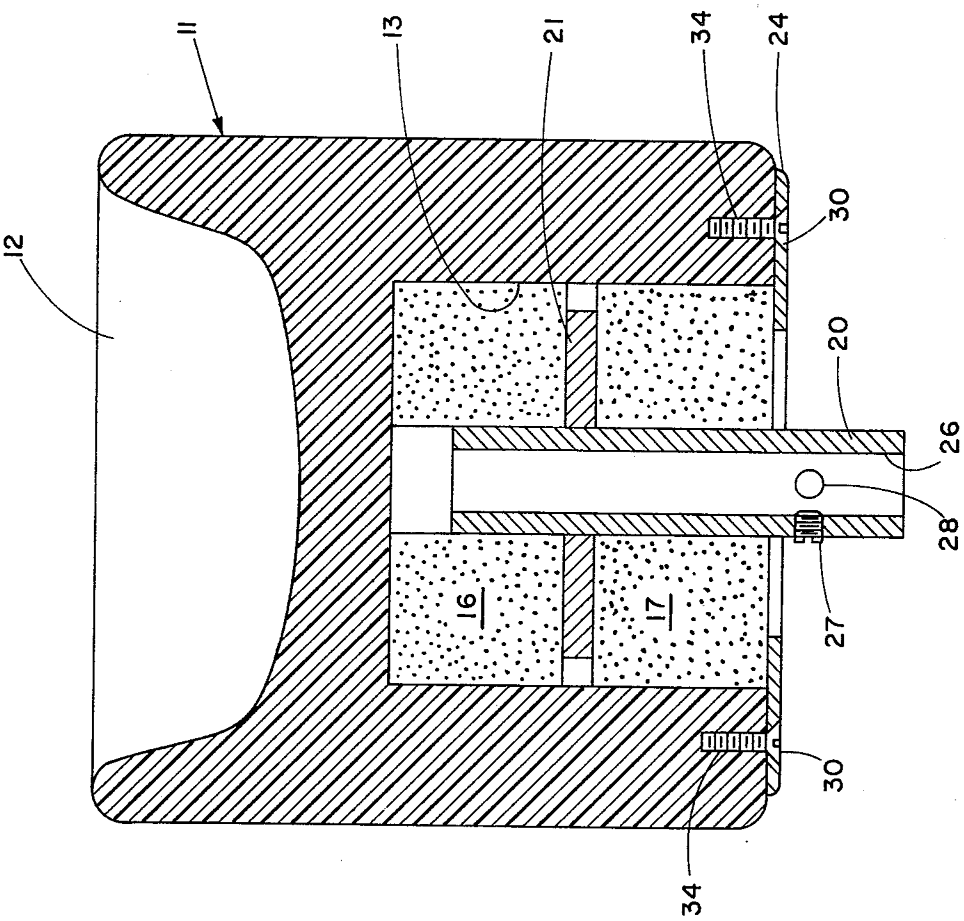

Other objects, advantages and novel features of the invention will become apparent from the following detailed description thereof when considered in conjunction with the accompanying drawing in which like numerals represent like parts throughout and wherein:

FIG. 1 is a cross-sectional view of the combined controller knob of the present invention; and FIG. 2 is an exploded view showing the components of the embodiment of FIG. 1.

The present invention, in general, concerns a force/-displacement controller for providing increased displacement characteristics for isometric controls. A controller knob receives a supporting tube in a chamber therein, with a desired degree of movement of the knob with respect to the tube provided by a rigid washer attached to the tube and compressible washers contacting each side of the rigid washer and substantially filling the chamber. Movement of the controller knob by a horizontal force results in the compression of opposing portions of the compressible washers, thereby giving a feeling of resistance in direct relation to the amount of force applied. The compressible washers return the knob to its original position upon release of pressure on the knob.

Referring to the drawing, FIG. 1 is a cross-section of one embodiment and includes a controller knob 11 preferably made of plastic and provided with a depression 12 for accommodating a finger tip and a chamber 13 for receiving the operative components of the device. These components include an upper washer 16 made of compressible material having selected compression characteristics, a lower washer 17 identical to upper washer 16, a support tube 20 preferably made of metal and having a rigid washer 21 also preferably made of metal affixed or firmly attached thereto, and a cover plate 24 which also preferably is made of metal and which is in the form of a washer having a flange width sufficient to retain lower washer 17 and the other components snugly within chamber 13. Tube 20 has an axial bore 26 which is adapted to fit in close relationship over a control shaft, not shown, with the tube secured thereto by a pair of set screws 27 and 28. Cover plate 24 is secured to knob 11 by a plurality of bolts 30 which are inserted through countersunk holes 31 in plate 24 and are received in respective drilled and tapped holes 34 in knob 11.

FIG. 2 is an isometric view showing the individual components of the device in the sequence in which they are inserted in to knob 11. The depression 12 in knob 11 may be formed as a groove with a rounded top edge as indicated at 33. In the preferred embodiment, knob 11 has a diameter and height of approximately 1 inch each. Chamber 13 preferably has a diameter of 0.60 inch, a depth of substantially 0.425 inch, and is drilled or bored in the bottom of the knob. Four small holes indicated at 34 in FIG. 1 are drilled and tapped in the bottom of the knob to hold coverplate 24. Washers 16 and 17 preferably are compressible round washers having outside and inside diameters of substantially 0.60 inch and 0.16 inch, respectively. These washers in this embodiment preferably have a thickness of substantially 0.25 inch. The compression characteristics of the material from which washers 16 and 17 are made determine the force-displacement relationship of the device. Support tube 20 is preferably made of metal for its necessary rigidity and has an outside diameter of substantially 0.16 inch and an inside diameter which matches the shaft diameter of the isometric control to which the device is to be attached. Tube 20 is made to receive the control shaft, not shown, in close fitting relationship but without restriction in assembly and is attached thereto by set screws 27 and 28. Thrust washer 21 is secured to support tube 20 at a longitudinal position which is determined so that it will be centrally positioned between compressible washers 16 and 17 when the components are assembled as shown in FIG. 1. The inner diameter of washer 21 is thus made to match the outer diameter of support tube 20, while the top of tube 20 and the outer periphery of washer 21 are spaced sufficiently from the walls of chamber 13 in the inoperative condition to preclude contact therebetween when knob 11 is canted by horizontal forces. Washer 21 preferably has in this embodiment a thickness of substantially 0.175 inch. The sum of the thicknesses of washers 16, 17 and 21 must exceed the depth of chamber 13 to assure compression of washers 16 and 17 upon assembly of the device.

As noted above, the compression characteristics of washers 16 and 17 determine the force-displacement relationship, i.e. the resistance to horizontal or omnidirectional pressure applied to knob 11, of the device. In operation, when a force other than vertical is applied to knob 11 by an operator's finger, the knob will attempt to rotate about thrust washer 21. Since upper and lower washers 16 and 17 are compressed between the thrust washer and the knob, resistance to both knob rotation and lateral movement is provided. This resistance to movement causes a transfer of the horizontal pressure to thrust washer 21, and the thrust washer transfers this input force to support tube 20 which in turn applies the input force to the control shaft upon which tube 20 is mounted. Obviously, washers 16 and 17 are shaped in thickness so as to exceed the space to be occupied by them in chamber 13. Bolts 30 which secure plate 24 to knob 11 effect the compressing of washers 16 and 17 when the components are assembled in the knob. Upon release of pressure on knob 11, the compressed washers return the knob to its original position.

The device is easily assembled and disassembled and thus easy to repair or to replace components. When a change is desired in the force-displacement relationship, i.e. the relationship existing between the force applied on tube 20 by pressure on knob 11 and the compressibility of washers 16 and 17, it is necessary only to replace washers 16 and 17 with a pair of washers similar in shape but having selectively different compression characteristics. The combined controller knob is also capable of increasing the displacement range of existing force controls with minimum controller modification. The displacement cue resulting from the opposed compression of two identical resilient washers is varied simply by replacing these washers, thus obviating any requirement for mechanical linkages such as gears, gimbals and springs for control actuation.

The controller knob of the invention has application in a variety of manually controlled equipment or devices requiring force control in response to manual control tasks. The invention may be used in Radar Cursor Control, E-O/IR/FLIR Sensor Slewing controls, Telescope Tracking Mounts, clamps and hoists, plotting boards and computer peripherals, among other applications.

Obviously many modifications and variations of the present invention are possible in the light of the above teachings. For example, the finger-tip controller knob may be replaced by a hand grip for use in the foregoing control applications as well as in present and prospective aircraft flight control systems which utilize isometric devices such as the F-16.

What is claimed is:

1. In combination with a control shaft for force controls:

an appendage having a chamber therein for receiving the free end of said shaft;

bifurcated compressible resilient means in said chamber for providing a selected resistance to force applied to said appendage;

rigid means secured to said shaft end and axially and laterally engaging said resilient means for transmitting selectively lesser force to said shaft than is applied to said appendage, said rigid means and said resilient means in part spaced from said appendage so as to permit selected movement of said rigid means in said chamber; and means secured to said appendage for retaining said resilient means in said chamber.

2. The control appendage of claim 1 wherein said appendage is a controller knob configured for finger-tip control of shaft movement, said resilient means is a set of compressible washers positioned one over the other in said chamber, and said rigid means includes a collar extending axially substantially through said chamber and a thrust washer positioned between said compressible washers and extending substantially across said chamber.

3. The control appendage of claim 2 wherein said compressible washers are substantially identical in shape and the sum of the thicknesses of said thrust washer and said compressible washers exceeds the depth of said chamber so that said compressible washers are under compression prior to the initial application of force to said controller knob, said controller knob made of plastic and having a depression remote from the end of said shaft for omnidirectionally accommodating a finger tip.

4. The control appendage of claim 3 wherein a change in force-displacement relationship is accomplished by replacing said compressible washers with washers of similar shape and selected compression characteristics.

5. The control appendage of claim 1 wherein said appendage is a controller hand grip and said resilient means is configured to be accommodated in said chamber under compression prior to the initial application of force to said hand grip.

6. The control appendage of claim 5 wherein said resilient means is a set of compressible washers positioned one over the other in said chamber, and said rigid means includes a collar extending axially substantially through said chamber and a thrust washer positioned between said compressible washers and extending substantially across said chamber.

* * * * *